United States Patent Office 3,708,497
Patented Jan. 2, 1973

3,708,497
1-SUBSTITUTED-2-NITROMETHYLENE-
PYRROLIDINES
Takashi Kamiya, Suita, and Masashi Hashimoto, Toyonaka, Japan, assignors to Societe d'Etudes Scientifiques et Industrielles de l'Ile-de-France, Paris, France
No Drawing. Continuation-in-part of abandoned application Ser. No. 850,234, Aug. 14, 1969. This application July 14, 1971, Ser. No. 162,647
Claims priority, application Japan, Aug. 19, 1968, 43/59,377; May 20, 1969, 44/38,886; June 9, 1969, 44/45,174
Int. Cl. C07d 27/04
U.S. Cl. 260—326.8
8 Claims

ABSTRACT OF THE DISCLOSURE 1-alkyl-2-aminomethylpyrrolidines and 1-benzyl-2-aminomethyl-pyrrolidines are utilized for the production of pharmaceuticals. The presently used process for producing such compounds involves significant contamination by undesired by-products. The process of this invention avoids such contamination by the utilization of novel intermediates.

This application is a continuation-in-part of the pending application, S.N. 850,234, filed Aug. 14, 1969, and now abandoned.

This invention relates to a process for preparing 1-substituted-2-aminomethylpyrrolidines and intermediates used in that process.

1-ethyl-2-aminomethylpyrrolidine has been heretofore prepared by heating 1-ethyl-3-chloropiperidine hydrochloride with ammonia (U.S. Pat. No. 3,031,452). However, by the practice of this known method there is also produced 1-ethyl-3-hydroxypiperidine, the isolation of which from the main product is difficult. Accordingly, this known method is not suitable for producing 1-substituted-2-aminomethylpyrrolidines employed as intermediates for pharmaceuticals which require materials of high purity.

In accordance with this invention, 1-alkyl-2-aminomethylpyrrolidines and 1-benzyl-2-aminomethylpyrroldines of high purity and yield are produced economically without contamination of deleterious by-products.

The process of this invention comprises reacting 1-substituted-2-pyrrolidinone (I), with an alkali metal alkoxide, nitromethane and either a di(lower alkyl) sulfate or tri (straight-chain lower alkyl) oxonium fluoroborate, alkali metal alkoxide and nitromethane to give 1-substituted-2-nitromethylenepyrrolidine (II). The 1-substituted-2-nitromethylenepyrrolidine is reduced with hydrogen in the presence of a catalytic hydrogenation metallic catalyst to give 1-substituted-2-aminomethylpyrrolidine (III). The reduction may be achieved with an acid and a metal.

The process of the present invention is shown by the following sequence of the formulae:

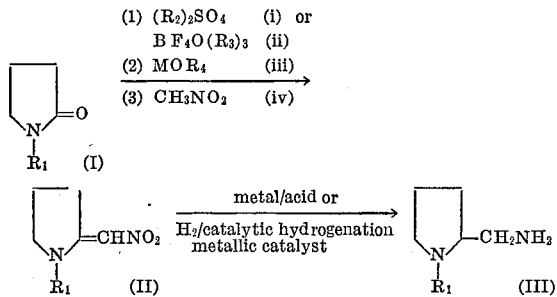

in which $R_1$ is lower alkyl or benzyl, $R_2$ is lower alkyl, $R_3$ represents a straight-chain lower alkyl group such as methyl or ethyl, $R_4$ is lower alkyl and M is an alkali metal. Throughout this application, $R_1$, $R_2$, $R_3$, $R_4$ and M have the same meaning as heretofore defined.

1-substituted-2-pyrrolidinone used as the starting material of the process of this invention may be produced for example by the method described in Chemical Abstracts, vol. 54, page 650b (1960). 1-ethyl-2-pyrrolidinone may be prepared by the method described in Chemical Abstracts, vol. 53, page 5235f (1959) and the other starting materials may be produced by the same procedure.

1-ethyl-2-pyrrolidinone may be also produced by hydrogenating 1-vinyl-2-pyrrolidinone in the presence of a catalytic hydrogenation metallic catalyst and this reduction process is involved in the scope of this invention. 1-vinyl-2-pyrrolidinone to be used as the starting material in the reducing process may be produced for example by the method described in Chemical Abstracts, vol. 56, page 14, 304b (1962).

The reduction process is carried out hydrogenating 1-vinyl-2-pyrrolidinone in the presence of catalytic hydrogenation metallic catalyst. Examples of the catalytic hydrogenation metallic catalysts to be used for reduction of 1-vinyl-2-pyrrolidinone are metal oxide blacks, colloidal metals, metals on carriers and skeleton metal catalysts in which the metal means noble metals, and transition metals. The frequently used catalysts are platinum black, rhodium on alumina, palladium on carbon and Raney nickel. Catalytic hydrogenation of 1-vinyl-2-pyrrolidinone is usually carried out in a solvent. Examples of solvents are water, methanol, ethanol, isopropanol, butanol, tetrahydrofuran, dioxane and other solvents inert to the reaction. They may be used alone or in combination. The initial pressure of hydrogen used in the reaction may be varied over a wide range of from atmospheric pressure to high pressure, but in general a pressure of from atmospheric pressure to a few atmospheres is sufficient for the reduction. It is preferred to stop the reaction, when the calculated amount of hydrogen is absorbed, by controlling the kind and the amount of the catalyst, the initial pressure of hydrogen, the reaction temperature and the reaction time. The reaction product, N-ethyl-2-pyrrolidinone may be isolated by removal of the catalyst by filtration followed by evaporation of the solvent, and, if desired, may be purified. However, the product may be used for the next reaction without purification.

The next step of the present process comprises reacting 1-substituted-2-pyrrolidinone (I) with di(lower alkyl) sulfate or tri(straight-chain lower alkyl)oxonium fluoroborate, an alkali metal alkoxide and nitromethane to give the compound (II). Examples of an alkyl group in 1-alkyl-2-pyrrolidinone, are methyl, ethyl, propyl, isopropyl and butyl. The di(lower alkyl) sulfate has the formula shown in (i) of the above reaction sequence wherein $R_2$ is a lower alkyl such as methyl, ethyl or n-propyl. The reaction of 1-alkyl-2-pyrrolidinone with di(lower alkyl) sulfate, does not require a solvent but may be carried out in a solvent such as ether, methanol, ethanol or benzene.

The reaction temperatures are particularly restricted and the reaction is ordinarily carried out at room temperature or under warming. The resulting product is believed to have the following structure:

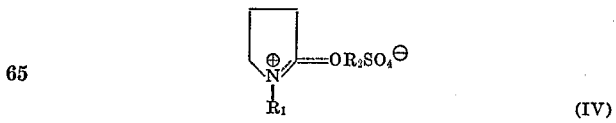

The reaction of 1-substituted-2-pyrrolidinone with tri (straight-chain lower alkyl)oxonium fluoroborate may be carried out in the absence or presence of a solvent. The solvent, if used, is desirably ethers, benzene or similar inert organic solvent. The reaction temperature may be varied over a wide range, but the reaction is usually run at room temperature or with heating. The resulting product is believed to have the following structure:

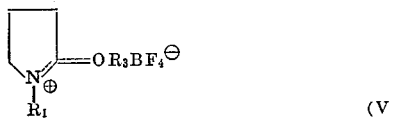

(V)

The tri(straight-chain lower alkyl)oxonium fluoroborate has the formula shown in (ii) of the above reaction sequence.

The tri(straight-chain lower alkyl)oxonium fluoroborate is usually prepared in situ. For example, such fluoroborate may be produced by adding dropwise 1,2-epoxy-2-chloropropane to a solution of a boron trifluoride etherate [$BF_3O(R_3)_2$] in an ether at room temperature with stirring, gently heating the resulting mixture at reflux, removing the ether by decantation after tri(straight-chain lower alkyl)oxonium fluoroborate has begun to solidify and precipitate, and washing the residual tri(straight-chain lower alkyl)oxonium fluoroborate with an anhydrous ether. The reaction is shown as follows:

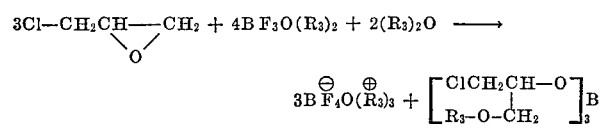

In general, the above reaction is carried out in a solvent. An anhydrous ether is usually used as the reactant and also as the solvent. The ether may be used in combination with other solvents such as anhydrous benzene, anhydrous dioxane and/or anhydrous dichloroethylene.

The resulting compound (IV) or (V) is then reacted with an alkali metal alkoxide. The alkali metal alkoxide means a compound which is derived by substituting an alkali metal such as sodium or potassium for the hydrogen of the hydroxyl group in an alcohol such as methanol, ethanol, propanol, isopropanol or butanol. The reaction is usually carried out in a solvent. The frequently used solvent is a lower alkyl alcohol such as ethanol, but other solvents inert to the reaction may be employed. The reaction temperature may be varied over a wide range, and the reaction is usually carried out with cooling, at room temperature or with heating. The resulting product is believed to have the following structure:

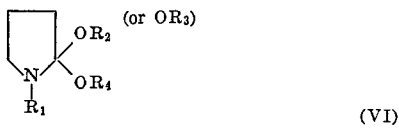

(VI)

The resulting compound (VI) may be isolated and purified, but may be used for the next reaction without isolation and purification.

The reaction of the said compound with nitromethane is carried out in the absence or presence of a solvent. The solvent which is used in the preceding step is usually employed without replacement. The reaction temperature may be varied over a wide range, but the reaction is usually conducted with cooling, at room temperature or with heating.

The resulting 1-substituted-2-nitromethylenepyrrolidine (II) may be isolated and purified, but may be subjected to the next reduction without isolation and purification.

Reduction of 1-substituted-2-nitromethylenepyrrolidine (II) is effected by the action of a metal and an acid or hydrogen in the presence of a catalytic hydrogenation metallic catalyst. Examples of the metals to be used in the metal-acid reduction are iron and zinc, and examples of the acids are hydrochloric acid and acetic acid. The reaction is ordinarily carried out in a solvent. Usually, the acid serves both as the reactant and the solvent. The reaction is usually carried out with heating. Examples of the catalytic hydrogenation metallic catalysts are metal oxide blacks, colloidal metals, metals on carriers and skeleton metal catalysts in which the metal means noble metals and transition metals.

The frequently used catalysts are platinum black, rhodium on alumina, palladium on carbon and Raney nickel. The catalytic hydrogenation is usually carried out in a solvent. Examples of solvents are water, methanol, ethanol, isopropanol, butanol, tetrahydrofuran, dioxane or other solvents inert to the reaction. They may be used alone or in combination. The initial pressure of hydrogen used in the reaction may be varied over a wide range of from atmospheric pressure to high pressure, but in general a pressure of from atmospheric pressure to a few atmospheres is sufficient for the reduction. It is preferred to stop the reaction, when the calculated amount of hydrogen is absorbed, by controlling the kind and the amount of the catalyst, the initial pressure of hydrogen, the reaction temperature and the reaction time. The reaction product (III) may be isolated by removal of the catalyst by filtration followed by evaporation of the solvent.

Ordinarily, the resulting 1-substituted-2-aminomethylpyrrolidine (III) may be converted into salts with mineral acids such as hydrochloric acid, hydrobromic acid, sulfuric acid and with organic acids such as oxalic acid, tartaric acid, maleic acid and picric acid.

A more comprehensive understanding of this invention is obtained by reference to the following examples:

EXAMPLE 1

(a) Preparation of 1-ethyl-2-pyrrolidinone

To a solution of 13.4 g. of 1-vinyl-2-pyrrolidinone in 70 ml. of methanol is added 3 g. of Raney nickel, and the resulting mixture is hydrogenated at atmospheric pressure and room temperature for 2 hours to absorb one molar equivalent of hydrogen. The reaction mixture is filtered to remove the Raney nickel, and the methanol is evaporated under reduced pressure. The residue is distilled to give 12.6 g. of 1-ethyl-2-pyrrolidinone as an oil boiling at 84 to 88° C. at 15 mm. Hg.

(b) Preparation of 1-ethyl-2-nitromethylenepyrrolidine

A solution of 11.3 g. of 1-ethyl-2-pyrrolidinone in 12.6 g. of dimethyl sulfate is warmed at 60 to 63° C. under stirring for one and one-half hours. To the resulting mixture is added dropwise, with stirring under cooling, a methoxide solution prepared by dissolving 2.3 g. of sodium in 70 ml. of anhydrous methanol. The resulting mixture is stirred for 30 minutes. To this mixture is added 9.2 g. of nitromethane and, after stirring for an hour and at room temperature, the reaction mixture is allowed to stand overnight. The methanol is removed by evaporation under reduced pressure from the resulting mixture, and the residue is mixed with 150 ml. of water and then extracted three times with the total amount of 150 ml. of chloroform. The chloroform layer is dried and evaporated and the residue is washed with ether. There are obtained 11.3 g. of crystals of 1-ethyl-2-nitromethylenepyrrolidine melting at 126 to 128° C.

(c) Preparation of 1-ethyl-2-aminomethylpyrrolidine

To a solution of 23.4 g. of 1-ethyl-2-nitromethylenepyrrolidine in 500 ml. of methanol is added about 5 g. of Raney nickel, and the resulting mixture is hydrogenated at atmospheric pressure and room temperature for about 5 hours to absorb 4 molar equivalents of hydrogen. The reaction mixture is filtered to remove the Raney nickel, and the solvent is evaporated under reduced pressure. The residue is distilled to give 15.7 g. of 1-ethyl-2-aminomethylpyrrolidine as an oil boiling at 58 to 50° C. at 16 mm. Hg.

The gas-liquid chromatograph of this material shows a single peak, and the infrared spectrum of the material is identical with that of an authentic sample prepared according to the method described in U.S. Pat. No. 3,031,452.

EXAMPLE 2

(a) Preparation of 1-ethyl-2-nitromethylenepyrrolidine

To a solution of 45.5 g. of boron trifluoride etherate in 150 ml. of anhydrous ether is added dropwise drop by drop 22.2 g. of 1,2-epoxy-3-chloropropane at room temperature with stirring, and the resulting mixture is stirred at room temperature for 2 hours.

The ether is removed by decantation, and the residue is washed with anhydrous ether several times. To the resulting triethyloxonium fluoroborate is added dropwise 22.6 g. of 1-ethyl-2-pyrrolidinone with ice-cooling. The resulting mixture is stirred at room temperature for 30 minutes and then allowed to stand for 2 hours. The ether which forms during the course of the reaction is removed by decantation, and the residue is added dropwise to a solution of 5.0 g. of sodium in 100 ml. of anhydrous ethanol with cooling. The resulting solution is stirred for 30 minutes at the same temperature and then mixed with 18.0 g. of nitromethane with ice-cooling. The resulting mixture is stirred at room temperature for 3 hours and allowed to stand overnight. The ethanol is removed by evaporation under reduced pressure, and the residue is mixed with water and then extracted with chloroform. The chloroform layer is dried and evaporated under reduced pressure. The residue is washed with ether to give 27.2 g. of 1-ethyl-2-nitromethylenepyrrolidine as crystals melting at 125 to 127° C.:

$$\lambda_{max.}^{EtOH} \ 349 \ m\mu \ (\epsilon \ 28,300)$$

*Analysis.*—Calcd. for $C_7H_{12}N_2O_2$ (percent): C, 53.83; H, 7.74; N, 17.91. Found (percent): C, 54.12; H, 7.85; N, 17.98.

(b) Preparation of 1-ethyl-2-aminomethylpyrrolidine

To a solution of 23.4 g. of 1-ethyl-2-nitromethylenepyrrolidine in 500 ml. of methanol is added about 5 g. of Raney nickel, and the resulting mixture is hydrogenated at atmospheric pressure and room temperature for about 5 hours to absorb 4 molar equivalents of hydrogen. The reaction mixture is filtered to remove the Raney nickel, and the solvent is evaporated under reduced pressure. The residue is distilled to give 15.7 g. of 1-ethyl-2-aminomethylpyrrolidine as an oil boiling at 58 to 60° C. at 16 mm. Hg.

The gas-liquid chromatograph of this material shows a single peak, and the infrared spectrum of the material is identical with that of an authentic sample prepared according to the method described in U.S. Pat. No. 3,031,452.

EXAMPLE 3

(a) Preparation of 1-methyl-2-nitromethylenepyrrolidine

To a solution of 91 g. of boron trifluoride etherate in 300 ml. of anhydrous ether is added dropwise 44.5 g. of 1,2-epoxy-3-chloropropane at room temperature with stirring, and the resulting mixture is stirred at room temperature for 2 hours. The ether is removed by decantation, and the residue is washed with anhydrous ether several times. To the resulting triethyl-oxonium fluoroborate is added dropwise 39.6 g. of 1-methyl-2-pyrrolidinone with ice-cooling. The resulting mixture is stirred at room temperature for 30 minutes and then allowed to stand for 2 hours. The ether which forms during the course of the reaction is removed by decantation, and the residue is added dropwise to a solution of 10 g. of sodium in 200 ml. of anhydrous ethanol with cooling.

The resulting solution is stirred for 30 minutes at the same temperature and then mixed with 36.0 g. of nitromethane with ice-cooling. The resulting mixture is stirred at room temperature for 3 hours and allowed to stand overnight. The ethanol is removed by evaporation under reduced pressure, and the residue is mixed with water and then extracted with chloroform. The chloroform layer is dried and evaporated under reduced pressure. The residue is washed with ether to give 44 g. of 1-methyl-2-nitromethylenepyrrolidine as crystals melting at 154° C.

(b) Preparation of 1-methyl-2-aminomethylpyrrolidine

1 - methyl-2-nitromethylenepyrrolidine in methanol is treated in a similar manner to the Example 2b to give 1-methyl-2-aminomethylpyrrolidine as an oil boiling at 56° C. at 18 mm. Hg.

The compounds produced by the process of this invention may also be used for the production of other substituted benzamides employed in the treatment of mammals for emesis and nervous disorders, as disclosed in U.S. Pat. No. 3,342,826. In addition, such compounds produced by the process of this invention are useful as reactants in the synthesis of anti-inflammatory agents when administered to mammals as disclosed in British Pat. 956,253 (published Apr. 22, 1964).

EXAMPLE 4

1-propyl-2-aminomethylpyrrolidine

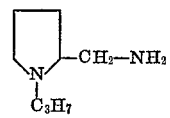

In a one liter flask, equipped with a sealed mechanical agitator, an ascendant refrigerant and a thermometer, 63 g. of dimethyl sulfate and 63.5 g. of N-propyl-pyrrolidinone are heated at 60° C. for 30 minutes. The mixture is then cooled to +15° C. and 350 ml. of sodium methylate (prepared with 11.5 g. of sodium and 350 ml. of methanol) are introduced. Agitation is maintained for 30 minutes before introducing 46 g. of nitromethane, drop by drop, while cooling to remain at 20° C. It is allowed to stand overnight and the solvent is then removed. It is recovered in a mixture of water-chloroform to extract the N-propyl-2-nitromethylene-pyrrolidine, having a melting point of 91° C.

In an hydrogenating apparatus, there are introduced 47 g. of N-propyl-2-nitromethylene-pyrrolidine dissolved in 600 ml. of methanol and 10 g. of Raney nickel. In 12 hours, 24 liters of hydrogen are taken up. It is filtered to separate the catalyst and the methanol is distilled. There are obtained 33 g. of 1-propyl-2-aminomethyl-pyrrolidine in the form of a yellowish-red oil with a refraction index of 1.4650 at 20° C.

EXAMPLE 5

1-butyl-2-aminomethyl-pyrrolidine

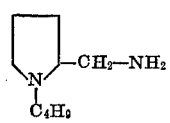

In a one liter flask, equipped with a mechanical agitator, an ascendant refrigerant and a thermometer, there are heated for 30 minutes 70.5 g. of N-butyl-pyrrolidinone (0.5 mole), 63 g. of dimethyl sulfate (0.5 mole) at 60° C. It is cooled to +15° C. and a solution of 350 ml. of sodium methylate (prepared with 11.5 g. of sodium and 350 ml. of methanol) is introduced. It is agitated for 30 minutes and 46 g. of nitromethane are added drop by drop with agitation continued for 2 hours. It is allowed to stand overnight and the solvent is then removed under vacuum. The crystallized residue is recovered in a mixture of water-chloroform (50—50) and the N-butyl-2-nitromethylene-pyrrolidine is extracted, having a melting point of 67° C., drying the chloroform phase with magnesium sulfate and then removing the solvent.

In an hydrogenating apparatus, 35 g. of N-butyl-2-nitromethylene-pyrrolidine in solution of 250 ml. of methanol is treated with 6 g. of Raney nickel. In 7 hours, 17 liters of hydrogen are taken up. It is filtered to eliminate the catalyst and the methanol is removed to obtain a yellowish-red oil, distilling at 104° C. under 22 mm. The refractive index at 20° C. is 1.4633 (weight, 20 g.; yield, 67%).

EXAMPLE 6

N-isobutyl-2-aminomethyl-pyrrolidine

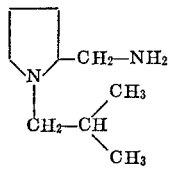

In a one liter flask, equipped with a sealed mechanical agitator, an ascendant refrigerant and a thermometer, 70.5 g. of N-isobutyl-pyrrolidinone and 63 g. of dimethyl sulfate are heated.

The procedure of Example 1 is followed to obtain 38 g. of N - isobutyl-2-nitromethylene-pyrrolidine having a melting point of 59° C.

The hydrogenation of this composition is carried out, as in Example 1, to obtain 26 g. (yield of 80%) of oil distilling at 109° C. under 7 mm., and having a refractive index at 20° C. of 1.4619. This is the N-isobutyl-2-aminomethyl-pyrrolidine.

EXAMPLE 7

1-isoamyl-2-aminomethyl-pyrrolidine

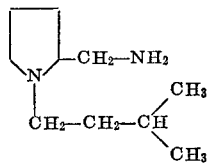

The procedure is the same as in Example 1 except that 155 g. of N-isoamyl-2-pyrrolidinone and 126 g. of dimethyl sulfate are placed in a 2 liter flask. There are obtained 118 g. of N-isoamyl-2-nitromethylene-pyrrolidine having a melting point of 78° C.

The experiment of Example 1 is followed exactly by hydrogenating 66 g. of this composition in 800 ml. of methanol. There are obtained 47 g. (84% yield) of oil with a refraction index of 1.4630 at 20° C. The 1-isoamyl-2-aminoethyl-pyrrolidine distills at 104° C. in 14 mm. of mercury.

EXAMPLE 8

N-benzyl-2-aminomethyl-pyrrolidine

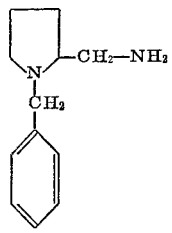

In a one liter flask, the procedure is the same as in Example 1 except for the utilization of 87.5 g. of N-benzyl-pyrrolidinone and 63 g. of dimethyl sulfate. 76 g. of N-benzyl-2-nitromethylenepyrrolidine having a melting point of 101° C. are obtained. This, hydrogenated as in Example 1, gives 35 g. of red oil distilling at 100–102° C., N-benzyl-2-aminomethyl-pyrrolidine.

What is claimed is:

1. A compound of the formula:

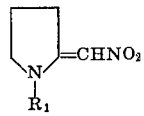

in which $R_1$ is lower alkyl or benzyl.

2. A compound of claim 1 in which $R_1$ is methyl.
3. A compound of claim 1 in which $R_1$ is ethyl.
4. A compound of claim 1 in which $R_1$ is propyl.
5. A compound of claim 1 in which $R_1$ is butyl.
6. A compound of claim 1 in which $R_1$ is isobutyl.
7. A compound of claim 1 in which $R_1$ is isoamyl.
8. A compound of claim 1 in which $R_1$ is benzyl.

References Cited

UNITED STATES PATENTS 3,318,908   5/1967   Swidinsky et al. ___ 260—326.62

NICHOLAS S. RIZZO, Primary Examiner

J. A. NARCAVAGE, Assistant Examiner

U.S. Cl. X.R.

260—326.3, 326.5 A, 326.5 S, 326.5 R, 326.85, 999